Figure 4:
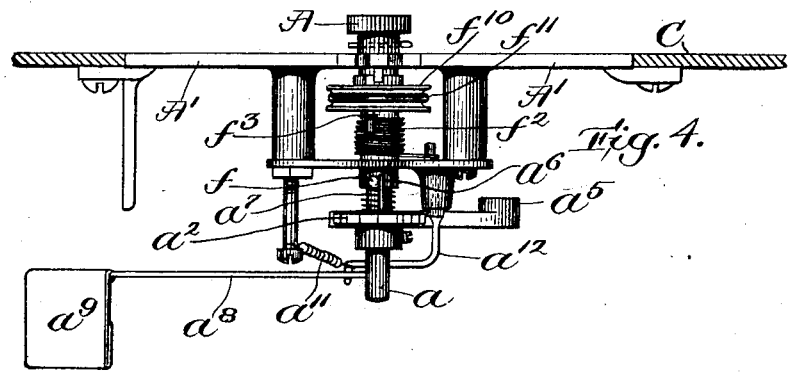

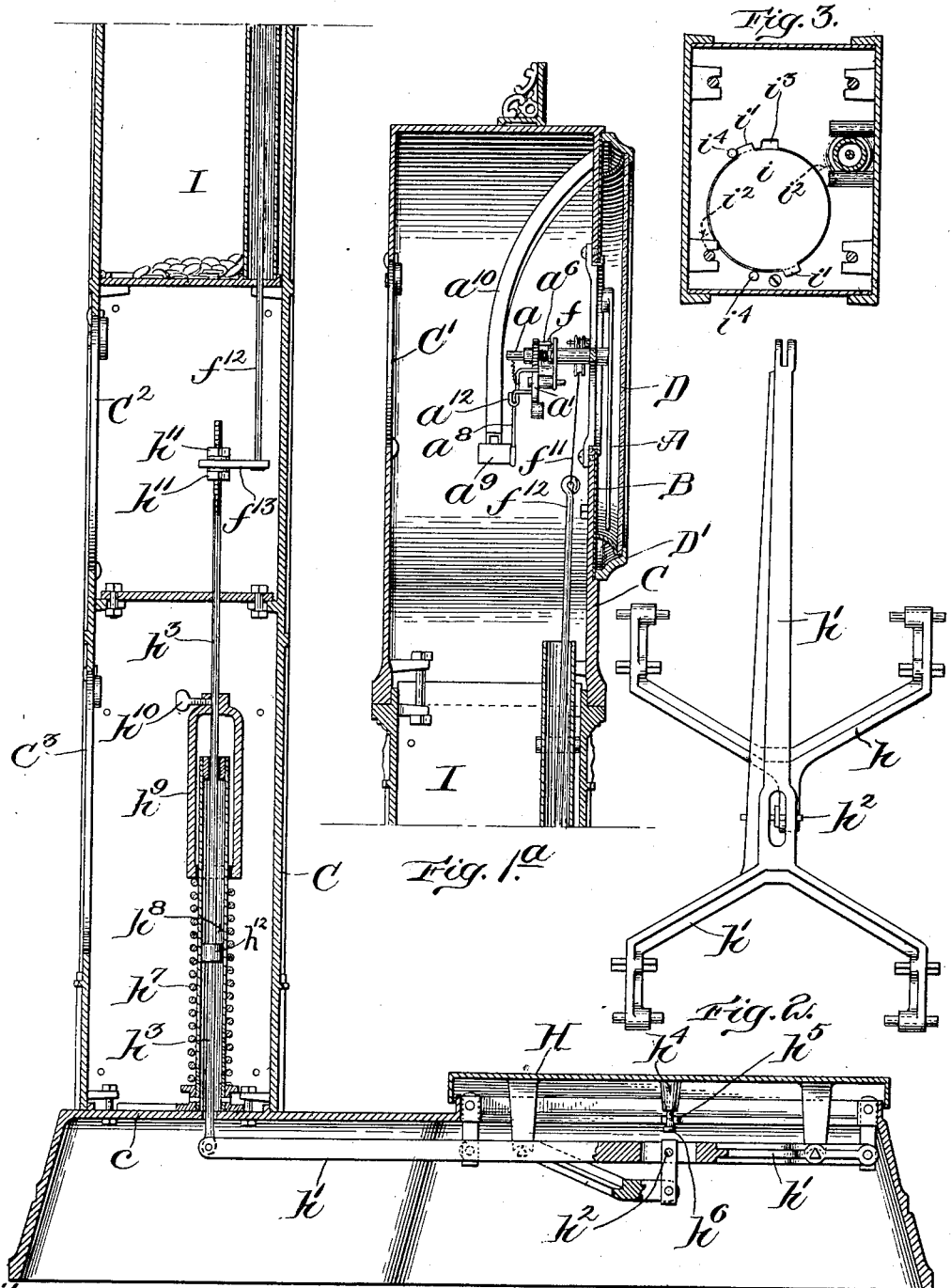

No. 733,066. PATENTED JULY 7, 1903.
A. A. MEYER.
AUTOMATIC WEIGHING MACHINE.
APPLICATION FILED JAN. 8, 1901.
NO MODEL. 2 SHEETS—SHEET 2.

Witnesses:
Arthur P. Randall
Wallace S. Dexter

Inventor:
Andrew A. Meyer
by Ira L. Fish
Attorney

No. 733,066. Patented July 7, 1903.

UNITED STATES PATENT OFFICE.

ANDREW A. MEYER, OF BOSTON, MASSACHUSETTS.

AUTOMATIC WEIGHING-MACHINE.

SPECIFICATION forming part of Letters Patent No. 733,066, dated July 7, 1903.

Application filed January 8, 1901. Serial No. 42,524. (No model.)

*To all whom it may concern:*

Be it known that I, ANDREW A. MEYER, of Boston, in the county of Suffolk and State or Massachusetts, have invented certain new and useful Improvements in Automatic Weighing-Machines, of which the following is a specification.

The invention relates to that class of weighing-machines in which upon the insertion of a coin in the proper place the weight of a body or person is indicated; and its object is to provide a simple and efficient mechanism for operating and controlling the devices which indicate the weight which will be accurate and sure in its action and not easily injured or disarranged.

The invention is especially designed for use in connection with weighing-machines for indicating the weight of persons in which the person to be weighed is supported on a platform which is spring-supported and is moved varying distances, according to the weight of the person supported thereon, the movement of the platform serving to operate or set a mechanism which controls the position of an indicating device by which the weight upon the platform is indicated. The invention is not, however, limited to this character of weighing-machine and may be embodied in machines in which the body or article to be weighed is otherwise supported.

In explaining the invention I will refer to its application to the character of weighing-machine above referred to, it being understood that the platform is referred to merely as one form of support through which the weight of the body or article is caused to operate the controller or stop which controls the position of the indicating device.

In a weighing-machine embodying the present invention the platform or other device for supporting the article to be weighed is connected with a rotary stop or controller which is moved to varying distances by different weights on the platform, the movement thus produced being independent of the indicating device, so that the indicating device is unaffected by the movement of the stop. The indicating device is locked in neutral position against the action of a spring or other mechanism, which tends to move said device, with the controller or stop, until it is unlocked by the action of a coin inserted in the machine. When thus unlocked, the indicating device moves until arrested by the stop or controller, the position of the indicating device when unlocked being thus determined or controlled by the position to which the stop is moved by the weight on the platform. When the indicating device has operated, it is locked against further forward movement, but is free to move back to neutral position as soon as the weight is removed from the platform.

In the accompanying drawings I have shown a weighing-machine embodying the features referred to in their preferred forms and also embodying certain other features of invention, which will be described hereinafter and referred to in the claims.

Figure 5:
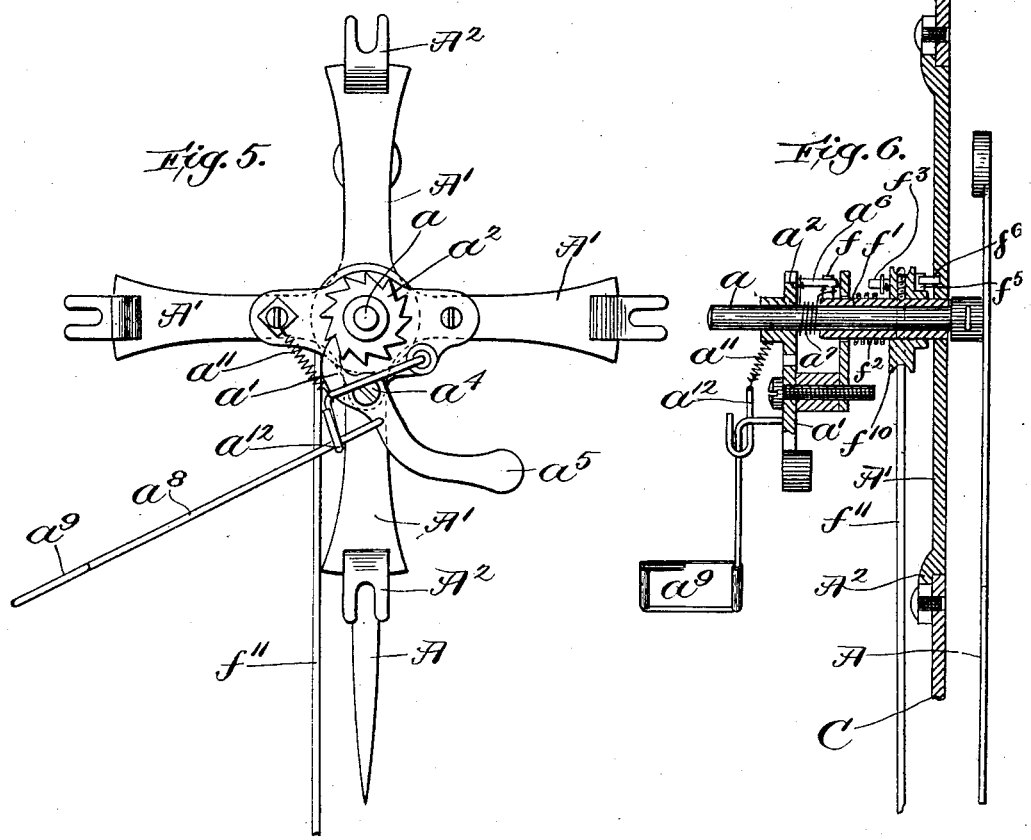
Figure 6:
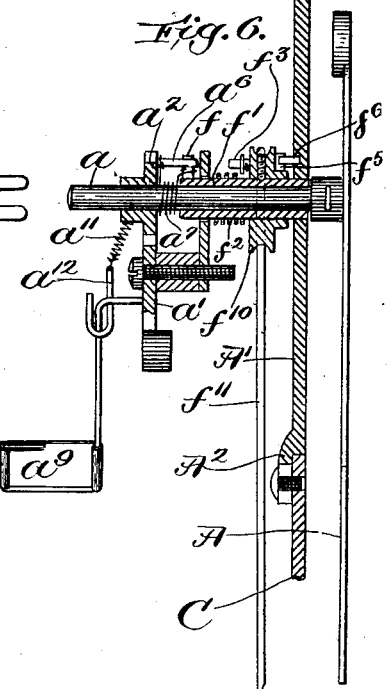

In said drawings, Figures 1 and 1ª are sectional elevations of the machine, the view being divided into two parts on account of the size of the sheet. Fig. 2 is a detail plan view of the levers on which the platform is carried. Fig. 3 is a detail showing the bottom of the coin-receptacle. Fig. 4 is a plan view of the mechanism for operating and controlling the indicating device. Fig. 5 is a rear elevation of the same, and Fig. 6 is a sectional view of the same.

In the machine which is shown in the drawings the device for indicating the weight consists of an index-finger A, arranged to move over a dial or scale B, on which the weights corresponding to the positions of the finger are indicated, as is common in this class of machine. The dial is in the form of an annular plate secured to the front side of the casing C, which supports and incloses the mechanism for controlling and operating the finger A, the casing being provided with a circular opening within the dial for a purpose to be explained. The dial and mechanism within the casing is protected by a plate of glass D, held in a frame D', secured to the front face of the casing, as shown in Fig. 1ª.

The finger A is secured to the outer end of a shaft $a$ and is held against forward movement by a pawl $a'$, arranged to engage a ratchet-wheel $a^2$, connected with the shaft $a$ by being secured directly thereto. A pawl $a'$ is pivoted at $a^4$, and the tail of the pawl is provided with a weight $a^5$, which tends to keep said pawl in engagement with the ratchet-wheel. When the pawl is disengaged from the ratchet-wheel, the shaft $a$ and finger A are free to move forward and will be so moved provided the mechanism for controlling the movement of the finger when released has been operated.

The mechanism for controlling the forward movement of the finger A when it is released by the pawl $a'$ consists of a controller in the form of a stop $f$, projecting from a hollow shaft or sleeve $f'$, surrounding the shaft $a$ and held in position by a spring $f^2$, one end of which is fixed and the other end of which is connected with the sleeve $f'$ at $f^3$, the spring acting to normally hold a shoulder $f^5$ on the sleeve $f'$ against a fixed pin or stop $f^6$. The ratchet-wheel $a^2$ is provided with a projecting pin $a^6$, which is arranged in the path of the stop $f$ and is yieldingly held in engagement therewith by a spring $a^7$, coiled about the shaft $a$ and having one end connected with the pin $a^6$ and the other end connected with the stop $f$. The sleeve $f'$ is connected with the device for supporting the body to be weighed in such a manner that the weight of the body will cause the sleeve to rotate in a direction to carry the stop $f$ away from the pin $a^6$, the springs $f^2$ and $a^7$ yielding to accommodate such movement, and the distance through which the stop $f$ will be moved will depend on the weight of the body which causes such movement. If after the stop $f$ has been thus moved and while the weight still acts to hold the stop in its advanced position the shaft $a$ is released, the spring $a^7$ will cause the shaft to be quickly rotated until the pin $a^6$ engages the stop $f$ and will hold the stop and pin in engagement. This movement of the shaft $a$ will move the indicating-finger A forward over the dial B, so that said finger will indicate the weight of the body which operated or set the stop $f$. As soon as the weight is removed the spring $f^2$ will return the sleeve $f'$ and stop $f$ to the normal position, and the stop $f$ in this movement will act upon the pin $a^6$ and carry the shaft $a$ and the finger A back to the neutral position, the pawl $a'$ riding over the ratchet-wheel as said wheel returns and preventing forward movement of said wheel.

The pawl may be disengaged from the ratchet-wheel to release the indicating-finger by the action of a coin on the arm $a^8$, secured to the pawl and having its outer end provided with a plate $a^9$, arranged at the end of a coin-chute $a^{10}$, as indicated in Fig. 1$^a$, so that a coin in passing from the chute will engage the arm and swing said arm downward, thus swinging the pawl out of engagement with the ratchet-wheel. As soon as the coin has passed the end of the arm $a^8$ the pawl is returned into engagement with the ratchet-wheel and will act to prevent forward movement of the indicating-finger, while permitting the return of the indicating-finger to its normal position.

The action of the weight $a^5$ in holding the pawl in engagement with the ratchet-wheel may be assisted by a spring $a^{11}$, having one end secured to a fixed part and having the other end secured to a lever $a^{12}$, the free end of which engages the arm $a^8$. With this arrangement the spring will act effectively to hold the pawl in engagement with the ratchet and will not return the pawl too quickly into engagement with the ratchet, since when the arm is swung downward by the coin the end of the lever will slide down the arm $a^8$, so that the distance from the pivot of the pawl to the end of the lever will be increased, thus diminishing the action of the spring in returning the pawl.

The body to be weighed is supported upon a platform H, which is mounted upon levers $h\ h'$, pivoted to the casing, the lever $h$ being connected with the lever $h'$ at $h^2$ and the lever $h'$ being extended and connected to the lower end of a rod $h^3$. A lug $h^4$ projects downward from the platform and is arranged above a projection $h^5$ on the casing, which forms a stop for limiting the downward movement of the platform. A screw $h^6$ passes through the projection $h^5$ into the lug $h^4$, the head of the screw underlying the projection $h^5$ and forming an adjustable stop for determining the upper position of the platform. The downward movement of the platform is resisted by a spring $h^7$, which surrounds the rod $h^3$, the lower end of the spring being supported upon a fixed part and the upper end of the spring engaging a sleeve $h^9$, secured to the rod $h^3$. The sleeve $h^9$ is secured to the rod by means of a set-screw $h^{10}$, so that said sleeve may be readily adjusted upon the rod to adjust the tension of the spring $h^7$. The downward movement of the platform against the action of the spring $h^7$ depends on the weight on the platform, and the platform is connected with the sleeve $f'$, so that the movement of the platform rotates the sleeve, the amount of rotation being proportional to the downward movement of the platform. The platform and sleeve may be thus connected by any suitable connections, and I prefer to employ the connecting devices of the machine shown. In this machine the sleeve $f'$ is provided with a pulley or drum $f^{10}$, about which is wrapped a cord $f^{11}$, the end of which is secured to the upper end of a rod $f^{12}$. The lower end of the rod $f^{12}$ is connected with the upper end of the rod $h^3$ by means of an arm $f^{13}$, projecting from the rod $f^{12}$ and held between nuts $h^{11}$ on the rod $h^3$. By adjusting the nuts the connection between the rod $h^3$ and the sleeve $f'$ may be properly adjusted.

The coins which pass through the coin-chute after engaging the end of the arm $a^8$ drop into a receptacle I. The coins may be removed from the receptacle through a circular opening I', formed in the bottom thereof, which is normally closed by a plate $i$, fitting within said opening. The plate is held in place by lugs $i'$, projecting from the upper edge of said plate and arranged to engage the upper surface of the bottom of the receptacle. The plate may be further held by lugs $i^2$, projecting from the under edge of the plate and arranged to engage the under surface of the bottom of the receptacle. A recess $i^3$ is provided at the edge of the opening I', through which the lug $i^2$ passes in inserting and removing the plate $i$, the plate being turned to bring the lug into register with said recess when the plate is to be removed and being turned to carry the lug out of register with said recess when the plate is inserted. Pins $i^4$ may be provided for limiting the movement of the plate, one pin serving to stop the rotation of the plate when the lug is registered with the recess.

The mechanism for operating and controlling the finger A is mounted upon a support provided with arms A', arranged to be secured to the inner surface of the casing, the casing being provided with an opening within the annular dial B, so that the finger A may be passed through the front of the casing in inserting or removing the mechanism and its support for the purpose of repair or in assembling the parts of the machine. With this construction the glass and frame at the front of the machine may be permanently secured to the casing and the mechanism for operating the finger A may be readily and conveniently removed or inserted through the back of the casing without disturbing the front of the casing or disconnecting the finger A. It is preferred to construct and arrange the arms A' so that the outer ends of the arms will engage the edge of the opening in the front of the casing, and thus center the pivot of the finger A, and it is also preferred to provide the ends of the arms with lugs $A^2$ to engage the inner surface of the casing and to secure the support in place by screws passing through said lugs. The casing is provided with doors $C'$ $C^2$ $C^3$, through which access may be had to the inside of the casing.

In order to eliminate the danger of injury to or unlicensed operation of the devices for indicating the weight upon the platform by sudden variations of the weight upon the platform, I prefer to provide means for retarding the effect of a sudden increase in the weight upon the platform. The means which I prefer to employ for retarding the effect of a sudden increase in pressure upon the platform consist of an air-cushioning device connected with the platform, which retards the movement of the platform when a pressure is applied thereto, but does not affect the ultimate position to which the platform is moved under a sustained pressure. This device prevents any injurious effect upon the indicating mechanism should the pressure upon the platform be suddenly varied, as by reason of a person jumping upon the platform, but does not prevent the proper operation of the indicating mechanism when the pressure upon the platform is constant and sustained, as when a person stands properly upon the platform.

The air-cushioning device which I have shown and prefer to employ is illustrated in Fig. 1. A stationary tube $h^8$ surrounds the rod $h^3$ and forms an air-cylinder within which is located a piston $h^{12}$, secured to the rod $h^3$. The lower end of the tube $h^8$ is closed by a partition $c$, through which the rod $h^3$ passes, the opening for the rod being large enough to form a restricted passage or vent for the air. When the weight upon the platform is suddenly increased, the movement of the rod $h^3$ is retarded by the air in the tube $h^8$ and shock or sudden movement of the parts connected with the rod $h^3$ is prevented. Should the pressure on the platform be sustained, however, the air will gradually escape through the opening at the bottom of the tube, allowing the weight upon the platform to have the proper effect upon the indicating mechanism. I also prefer to provide an air-chamber above the piston $h^{12}$, as shown, for retarding the return of the parts when the pressure upon the platform is suddenly reduced.

What I claim, and desire to secure by Letters Patent, is—

1. The combination with an indicating device, means for operating the indicating device, a holding device for preventing forward movement of said indicating device, a controller operated to varying distances by different weights to determine the position of the indicating device when released, means for operating said holding device by a coin to release said indicating device and means for operating said holding device to prevent further forward movements of said indicating device after it is arrested by said controller.

2. The combination with an indicating device, means for operating the indicating device, of a ratchet-wheel connected with said indicating device, a pawl engaging said wheel, means of disengaging said pawl by the action of a coin, and a controlling mechanism operated to varying distances by different weights for controlling the position of the indicating device when said pawl is disengaged from the ratchet and means for immediately engaging said pawl with said ratchet to prevent further forward movements of said indicating device after it is arrested by said controlling mechanism.

3. The combination with an indicating device, of a ratchet-wheel connected therewith, a pawl engaging said wheel, means for disengaging said pawl by the action of a coin, an independently-movable shaft or sleeve provided with a stop for controlling the position of the indicating device when released, a spring connecting said sleeve and ratchet-wheel, a platform, and connections between said sleeve or shaft and platform whereby the movement of the platform rotates said sleeve or shaft.

4. The combination with an indicating device, of a ratchet-wheel connected therewith, a coin-controlled pawl engaging said ratchet-wheel, a shaft or sleeve, a spring connecting said shaft and ratchet-wheel, and a weight-operated device connected with said sleeve.

5. The combination with an indicating device, of a ratchet-wheel connected with said indicating device, a sleeve or shaft rotated to varying distances by different weights, a spring for holding said shaft in normal position, a stop on said sleeve engaging said ratchet-wheel, a spring connecting said shaft and wheel and a coin-controlled pawl engaging said ratchet-wheel.

6. The combination with a casing provided with an annular dial, a support provided with means for securing the same inside the casing, an indicating-finger mounted in said support, means for operating the same, an opening through the casing at the center of the dial through which the index-finger may be passed, a controller mechanism mounted on said support and operated to varying distances by different weights for controlling the position of the index-finger when released, a holding device mounted on said support for preventing forward movement of said index-finger, and means for operating said holding device by a coin to release said index-finger.

7. The combination with a casing provided with an annular dial, a circular opening through the casing within the dial, an indicating mechanism provided with an index-finger for moving over the dial, a support for said mechanism provided with devices concentric with the axis of said indicating-finger for engaging the edge of said opening and with devices for securing said support inside the casing, a holding device mounted on said support for preventing forward movement of said finger, means for operating said holding device by a coin, a controller mounted on said support for determining the position of said index-finger when released, a platform moved to varying distances by different weights, and connections between said platform and controller.

8. The combination with a casing provided with an annular dial, a support provided with means for securing the same inside the casing, an indicating-finger mounted on said support, devices mounted on said support controlled by the insertion of a coin for operating said indicating-finger, a controller mechanism mounted on said support and operated to varying distances by different weights for controlling the position of the index-finger when operated through the insertion of a coin, and an opening through the casing at the center of the dial through which the index-finger may be passed from the inside of the casing.

In testimony whereof I have affixed my signature in presence of two witnesses.

ANDREW A. MEYER.

Witnesses:
IRA L. FISH,
CHARLES C. READ.